United States Patent Office 2,894,987
Patented July 14, 1959

2,894,987
N-ALLYL-2-AMINOISOCAMPHANE

Gustav A. Stein, Plainfield, and Karl Pfister III, Westfield, N.J., assignors to Merck & Co., Inc., Rahway, N.J., a corporation of New Jersey No Drawing. Application April 4, 1957
Serial No. 650,563

3 Claims. (Cl. 260—563)

This invention is concerned with novel isocamphane compounds useful in the treatment of hypertensions. More particularly, it relates to N-allyl-2-aminoisocamphane, salts thereof, and processes for the preparation of these products.

The novel compound of the present invention having the structural formula

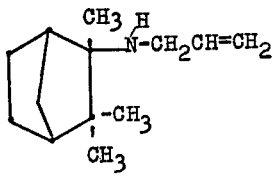

and its acid addition salts are valuable ganglionic blocking agents. These products can be administered in suitable pharmaceutical forms and produce a significant degree of ganglionic blocking action to inhibit the transmission of nerve impulses through both the sympathetic and parasympathetic ganglia of the autonomic nervous system, thereby lowering the blood pressure associated with hypertension.

It is an object of the present invention to provide N-allyl-2-aminoisocamphane, acid salts thereof, and processes for the preparation of these products. Another object is to provide pharmaceutical preparations containing N-allyl-2-aminoisocamphane or its salts which are suitable for the treatment of hypertension. Other objects will be apparent from the detailed description of this invention hereinafter provided.

In accordance with one embodiment of the present invention, N-allyl-2-aminoisocamphane is obtained by intimately contacting the 2-aminoisocamphane with an allyl halide in the presence of a suitable base. This reaction is conveniently carried out by intimately contacting the reactants in a suitable inert solvent medium. Thus, N-allyl-2-aminoisocamphane is readily prepared by reacting 2-aminoisocamphane with allyl bromide in the presence of sodium bicarbonate in an ethanolic medium under reflux. After the reaction is complete the resulting mixture is filtered and the filtrate concentrated under reduced pressure to obtain a residue containing the desired N-allyl-2-aminoisocamphane. The base so obtained can be converted to its acid salts by reaction with suitable acids in accordance with methods well-known in this art.

The following example is presented as an illustrative embodiment of our method of making compounds of the present invention.

EXAMPLE
N-allyl-2-aminoisocamphane hydrochloride

A mixture of 2-aminoisocamphane (3.07 g.), ethanol (20 ml.), sodium bicarbonate (5.04 g.), and allyl bromide (1.9 ml.) is refluxed with stirring overnight (16 hours). The reaction mixture is filtered and the filtrate concentrated in vacuo to a reddish brown oily residue. The residue containing the N-allyl-2-aminoisocamphane is redissolved in ether, filtered, and the product precipitated as the hydrochloride with ethereal HCl. Obtained 3.57 g. melting at 190–200°. Recrystallization from boiling methyl isobutyl ketone gave pure N-allyl-2-aminoisocamphane hydrochloride M.P. 215–215.5° C. dec.

N-allyl-2-aminoisocamphane and its acid salts are useful new chemical compounds having valuable pharmacological properties. Thus, N-allyl-2-aminoisocamphane because of its activity as a ganglionic blocking agent is useful in the treatment of hypertension by reducing the blood pressure.

N-allyl-2-aminoisocamphane and its salts in amounts ranging from about 10–100 mgms. per day can be administered either orally or by injection in dosage-unit forms containing about 1 to 20 mgs. for use as a ganglionic blocking agent.

For oral administration the novel products of this invention can be administered in suitable forms such as tablets or capsules containing suitable extenders or excipients which can be prepared in accordance with procedures well-known in the art. For example, tablets containing about 10 mgms. each of N-allyl-2-aminoisocamphane can be prepared as follows:

105 g. N-allyl-2-aminoisocamphane hydrochloride
291.9 g. lactose
115.5 g. dicalcium phosphate
31.5 g. starch
10.5 g. acacia gum
10.5 g. talc
2.1 g. magnesium stearate The isocamphane compound, lactose, dicalcium phosphate, starch and acacia gum are mixed and passed through a No. 60 bolt. After adding the talc and magnesium stearate to the bolted material, the mixture is slugged to form granules. The granules are then passed through a No. 12 and then a No. 18 sieve, and the fines reslugged to form granules of the desired size. The granules are then compressed into tablets.

Alternatively, capsules of N-allyl-2-aminoisocamphane hydrochloride can be prepared as follows:

About 2.5 grams of the isocamphane hydrochloride is mixed with 25 grams of lactose and then passed through a No. 90 bolting cloth, remixed well and then incorporated with an additional 225 grams of lactose. After thorough mixing the powder is passed through No. 60 bolting cloth, mixing well between each passage. The mixture is then encapsulated in No. 3 capsules yielding approximately 1,000 capsules each containing 0.2525 gram of powder.

A suitable elixir containing 10 mg. of N-allyl-2-aminoisocamphane per 5 cc. of solution can be prepared as follows:

| | Percent |
|---|---|
| N-allyl-2-aminoisocamphane hydrochloride | 0.200 |
| Glycerin | 20.000 |
| Alcohol | 15.000 |
| Simple syrup, U.S.P. | 35.000 |
| F.D. & C. Red No. 2 | 0.100 |
| Imitation vanilla | 0.005 |
| Imitation raspberry | 0.003 |
| Water, distilled, q.s. to 100.000. | |

The isocamphane hydrochloride is dissolved in the alcohol and the flavors, glycerin, syrup and amaranth (F.D. & C. Red No. 2) which are previously dissolved in a small portion of the water are added thereto. The remainder of the water then is added, the solution mixed well by stirring and filtered, yielding a clear elixir.

Solutions of N-allyl-2-aminoisocamphane salts suitable for parenteral injection are also prepared in accordance with procedures known in the art. For example, the following are formulations of suitable preparations:

*10% solution*

10% N-allyl-2-aminoisocamphane hydrochloride
0.9% sodium chloride
Q.e.s. pyrogen-free water pH 5.45

*1% solution*

1% N-allyl-2-aminoisocamphane hydrochloride
0.57% sodium chloride
0.15% methylparaben
0.02% propylparaben
Q.e.s. pyrogen-free water pH 5.35

In the above-described formulations, the N-allyl-2-aminoisocamphane hydrochloride can be replaced by other acid salts of the base. Thus, as indicated above, other acid addition salts of N-allyl-2-aminoisocamphane are prepared by combining the free base with the desired acid by known methods. Acid addition salts of any non-toxic mineral or organic acid can be employed in the compositions of this invention, although in substantially all cases the hydrochloride can be used with advantage. Examples of other suitable pharmacologically acceptable salts which might be mentioned are the phosphate, the sulfate, and salts of organic hydroxy acids such as the glycollate, tartrate, lactate and the like.

Various changes and modifications of the invention can be made and, to the extent that such variations incorporate the spirit of this invention, they are intended to be included within the scope of the appended claims.

What is claimed is:

1. A compound selected from the group consisting of N-allyl-2-aminoisocamphane and pharmacologically acceptable acid salts thereof.
2. N-allyl-2-aminoisocamphane.
3. N-allyl-2-aminoisocamphane hydrochloride.

References Cited in the file of this patent

Stein et al.: vol. 78, J.A.C.S. pp., 1514–5 (April 5, 1956).
Huckel et al.: Ann., vol 528, pp. 71–2 (1937).
Vavon et al.: vol. 44, Chem. Abst., p. 2480 (1950).
Lipp et al.: Ber. Deut. Chem., vol. 71B, pp. 1808–9 (1938).